United States Patent
Gadkaree et al.

(10) Patent No.: US 8,405,955 B2
(45) Date of Patent: *Mar. 26, 2013

(54) HIGH PERFORMANCE ELECTRODES FOR EDLCS

(75) Inventors: Kishor Purushottam Gadkaree, Painted Post, NY (US); Shrisudersan Jayaraman, Painted Post, NY (US); James Robert Lim, Painted Post, NY (US); Jia Liu, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 411 days.

This patent is subject to a terminal disclaimer.

(21) Appl. No.: 12/724,451

(22) Filed: Mar. 16, 2010

(65) Prior Publication Data

US 2011/0228447 A1    Sep. 22, 2011

(51) Int. Cl.
*H01G 9/00* (2006.01)
(52) U.S. Cl. .................. 361/502; 423/445 R
(58) Field of Classification Search ............. 361/502; 423/445 R
See application file for complete search history.

(56) References Cited

U.S. PATENT DOCUMENTS

| | | | | |
|---|---|---|---|---|
| 5,150,283 A | 9/1992 | Yoshita et al. | ............... | 361/502 |
| 6,110,335 A | 8/2000 | Avarbz et al. | ............... | 204/284 |
| 6,258,337 B1 | 7/2001 | Sonobe et al. | ............... | 243/445 |
| 6,574,092 B2 | 6/2003 | Sato et al. | ..................... | 361/502 |
| 6,602,742 B2 | 8/2003 | Maletin et al. | ............... | 438/142 |
| 6,631,073 B1 | 10/2003 | Sakata et al. | ................ | 361/502 |
| 6,631,074 B2 | 10/2003 | Bendale et al. | .............. | 361/509 |
| 6,697,249 B2 | 2/2004 | Maletin et al. | ............... | 361/502 |
| 6,704,192 B2 | 3/2004 | Pekala | ......................... | 361/502 |
| 6,798,643 B2 | 9/2004 | Oyama et al. | ................ | 361/502 |
| 6,845,003 B2 | 1/2005 | Oyama et al. | ................ | 361/502 |
| 6,940,706 B2 | 9/2005 | Sakata et al. | ................ | 361/303 |
| 6,946,007 B2 | 9/2005 | Bendale et al. | .............. | 29/25.03 |
| 7,102,877 B2 | 9/2006 | Mitchell et al. | ............. | 361/502 |
| 7,147,674 B1 | 12/2006 | Zhong et al. | ................ | 29/25.03 |
| 7,154,738 B2 | 12/2006 | Oyama et al. | ................ | 361/502 |
| 7,254,578 B2 | 8/2007 | Devarakonda et al. | .......... | 707/8 |
| 7,295,423 B1 | 11/2007 | Mitchell et al. | ............. | 361/502 |
| 7,419,745 B2 | 9/2008 | Chaturvedi et al. | ......... | 429/231.8 |
| 7,492,572 B2 | 2/2009 | Ozawa et al. | ................ | 361/504 |
| 2002/0126439 A1 | 9/2002 | Sato et al. | ..................... | 361/502 |
| 2004/0004208 A1 | 1/2004 | Sakata et al. | ................ | 252/500 |
| 2006/0093915 A1 | 5/2006 | Lundquist et al. | ......... | 429/231.8 |

(Continued)

FOREIGN PATENT DOCUMENTS

EP    19366742 A1    6/2008
JP    2006-303157    11/2006

(Continued)

OTHER PUBLICATIONS

Jung et al., Nitrogen and Hydrogen Adsortion of Activated Carbon Fibers Modified by Fluorination, 2009, Journal of Industrial and Engineering Chemistry, 15, 410-414.*

(Continued)

*Primary Examiner* — Eric Thomas
(74) *Attorney, Agent, or Firm* — Michael W. Russell

(57) ABSTRACT

An electric double layer capacitor composite electrode includes a current collector having opposing major surfaces, first and second conductive layers formed over respective ones of the major surfaces, and first and second carbon-based layers formed over the first and second conductive layers.

18 Claims, 4 Drawing Sheets

U.S. PATENT DOCUMENTS

| | | | |
|---|---|---|---|
| 2007/0183958 A1 | 8/2007 | Fujino et al. | 423/445 |
| 2008/0003166 A1 | 1/2008 | Maletin et al. | 423/445 |
| 2008/0008901 A1 | 1/2008 | Sugiura et al. | 428/639 |
| 2008/0151472 A1 | 6/2008 | Maletin et al. | 361/502 |
| 2008/0201925 A1 | 8/2008 | Zhong et al. | 29/25.03 |
| 2008/0204973 A1 | 8/2008 | Zhong et al. | 361/502 |
| 2009/0086409 A1 | 4/2009 | Kang et al. | 361/502 |
| 2009/0135547 A1 | 5/2009 | Nanba et al. | 361/502 |
| 2009/0154061 A1 | 6/2009 | Nanba et al. | 361/502 |
| 2009/0296315 A1 | 12/2009 | Eguchi et al. | 361/502 |
| 2009/0316334 A1 | 12/2009 | Fukumine et al. | 361/502 |
| 2010/0002362 A1 | 1/2010 | Clelland et al. | 361/502 |
| 2010/0008020 A1 | 1/2010 | Schneuwly | 361/502 |
| 2011/0182000 A1* | 7/2011 | Gadkaree et al. | 361/502 |
| 2011/0292569 A1* | 12/2011 | Gadkaree et al. | 361/502 |
| 2011/0292571 A1* | 12/2011 | Gadkaree et al. | 361/502 |
| 2012/0081837 A1* | 4/2012 | Gadkaree et al. | 361/502 |

FOREIGN PATENT DOCUMENTS

| | | |
|---|---|---|
| WO | WO99/38177 | 7/1999 |
| WO | WO2009/041074 | 4/2009 |

OTHER PUBLICATIONS

Burke, "Ultracapacitors: why, how, and where is the technology," J. of Power Sources 91 2000 pp. 37-50.

Eikerling, et al, Optimized Structure of nanoporous Cabon-based Double-Layer Capacitors J. of The Electrochemical Society 152 (1) E24-E33 (2005).

* cited by examiner

HIGH PERFORMANCE ELECTRODES FOR EDLCS

BACKGROUND AND SUMMARY

The present disclosure relates generally to electric double layer capacitors and more specifically to carbon-based composite electrodes comprising microporous activated carbon for use in such capacitors.

Energy storage devices such as ultracapacitors may be used in many applications such as where a discrete power pulse is required. Example applications range from cell phones to hybrid vehicles. Energy storage devices typically comprise a porous separator and/or an organic electrolyte sandwiched between a pair of carbon-based electrodes. The energy storage is achieved by separating and storing electrical charge in the electrochemical double layer at the interfaces between the electrolyte and the electrodes. Important characteristics of these devices are the energy density and power density that they can provide, which are both largely determined by the properties of the carbon-based electrodes.

Carbon-based electrodes suitable for incorporation into high energy density devices are known. The carbon materials, which form the basis of such electrodes, can be made from natural or synthetic precursor materials. Known natural precursor materials include coals, nut shells, and biomass, while synthetic precursor materials typically include phenolic resins. With both natural and synthetic precursors, carbon materials can be formed by carbonizing the precursor and then activating the resulting carbon. The activation can comprise physical (e.g., steam) or chemical activation.

A property of the carbon that can influence its success when incorporated into high energy density devices such as electric double layer capacitors (EDLCs) is the material's specific capacitance. Higher specific capacitance generally results in a higher volumetric energy density of the resulting device. Accordingly, it would be an advantage to provide activated carbon materials as well as methods for making activated carbon materials having a high specific capacitance. Such materials can be used to form carbon-based electrodes that enable higher energy density devices.

According to one embodiment, an electric double layer capacitor electrode includes a current collector having opposing major surfaces, first and second conductive layers formed over respective ones of the major surfaces, and first and second carbon-based layers formed over the first and second conductive layers. The carbon-based layer comprises microporous activated carbon.

The activated carbon may be characterized by its pore size distribution, where pores having a size of $\leq 1$ nm provide a combined pore volume of $\geq 0.3$ cm$^3$/g, pores having a size of from $>1$ nm to $\leq 2$ nm provide a combined pore volume of $\geq 0.05$ cm$^3$/g, and the activated carbon comprises $<0.15$ cm$^3$/g combined pore volume of any pores having a size of $>2$ nm.

Additional features and advantages of the invention will be set forth in the detailed description which follows, and in part will be readily apparent to those skilled in the art from that description or recognized by practicing the invention as described herein, including the detailed description and the claims.

It is to be understood that both the foregoing general description and the following detailed description present embodiments of the invention, and are intended to provide an overview or framework for understanding the nature and character of the invention as it is claimed.

The accompanying drawings are included to provide a further understanding of the invention, and are incorporated into and constitute a part of this specification. The drawings illustrate various embodiments and together with the description serve to explain the principles and operations of the invention.

DETAILED DESCRIPTION

Figure 1:
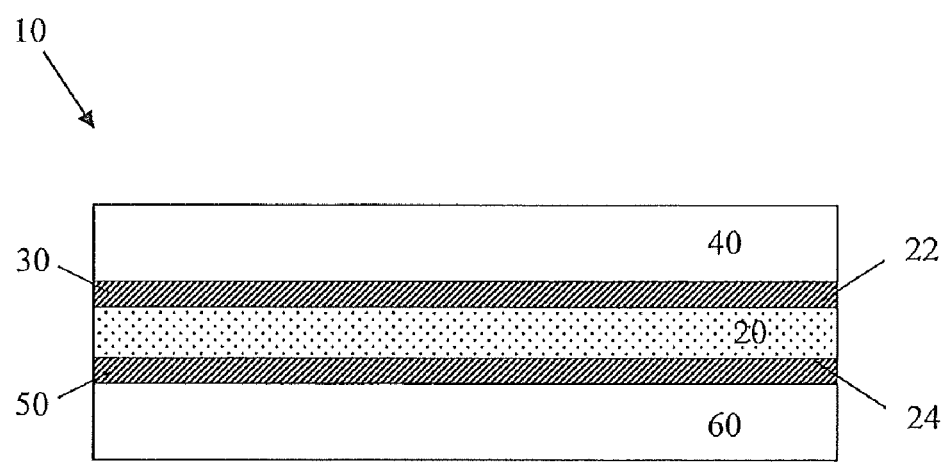
FIG. 1 is a schematic illustration of a composite electrode structure according to one embodiment.

According to one embodiment of the disclosure, a carbon-based composite electrode 10 for an EDLC comprises a current collector 20 having opposing first and second major surfaces 22, 24, a first conductive layer 30 formed over the first major surface 22, a second conductive layer 40 formed over the second major surface 24, and a first carbon-based layer 40 and a second carbon-based layer 60 formed over respective ones of the first and second conductive layers 30, 50.

The current collector 20 can comprise a metal (e.g., aluminum) or a conductive metal alloy. In embodiments, one or both of the opposing first and second major surfaces 22, 24 include a native oxide of the base metal or alloy that is not removed prior to forming the first and second conductive layers.

The carbon-based layers may comprise microporous activated carbon. As defined herein, microscale pores have a pore size of 2 nm or less. Mesoscale pores have a pore size ranging from 2 to 50 nm. Macroscale pores have a pore size greater than 50 nm. In an embodiment, activated carbon incorporated into the composite electrode comprises a majority of microscale pores. As used herein, the term "microporous carbon" and variants thereof means an activated carbon having a majority (i.e., at least 50%) of microscale pores. A microporous, activated carbon material can comprise greater than 50% microporosity (e.g., greater than 50, 55, 60, 65, 70, 75, 80, 85, 90 or 95% microporosity). The microporous carbon can have a specific surface area greater than about 300 m$^2$/g, i.e., greater than 300, 350, 400, 500 or 1000 m$^2$/g. By way of example, the microporous carbon can have a specific surface area less than 2500 m$^2$/g, i.e., less than 2500, 2000, 1500, 1200 or 1000 m$^2$/g.

In one example embodiment, the microporous carbon comprises pores having a size of up to 1 nm, which provide a combined pore volume of at least 0.3 cm$^3$/g, pores having a size of from 1 nm to 2 nm, which provide a combined pore volume of at least 0.05 cm$^3$/g, and less than 0.15 cm$^3$/g combined pore volume of any pores having a size of greater than 2 nm.

The performance of EDLCs comprising carbon-based composite electrodes can be intimately related to the properties of the carbon. Specifically, the total available porosity and pore size distribution can impact EDLC performance. It has been commonly thought that significant quantities of mesopores are needed for electrolyte ion access to the interior surfaces of the carbon. In this disclosure, it is demonstrated that an activated carbon that is predominantly microporous with little mesoporosity exhibits superior performance and significantly higher volumetric specific capacitance (or energy density) in an EDLC than commercial carbons that have a substantial amount of mesoporosity. This advantage is attributable to the unique pore size distribution of the carbon materials disclosed herein.

According to embodiments, a carbon-based layer for an EDLC composite electrode comprises activated carbon material having a total porosity greater than 0.4 cm$^3$/g (e.g., greater than 0.4, 0.45, 0.5, 0.55, 0.6, 0.65 or 0.7 cm$^3$/g). The portion of the total pore volume resulting from micropores (d≦2 nm) can be 95% or greater (e.g., at least 95, 96, 97, 98 or 99%) and the portion of the total pore volume resulting from ultramicropores (d≦1 nm) can be 60% or greater (e.g., at least 60, 65, 70, 75, 80, 85, 90 or 95%). The pore size distribution of the activated carbon can include ultramicropores, micropores, mesopores and macropores and may be characterized as having a unimodal, bimodal or multi-modal pore size distribution. The ultramicropores can comprise 0.3 cm$^3$/g or more (e.g., 0.4 cm$^3$/g or more) of the total pore volume. Pores having a pore size (d) in the range of 1<d≦2 nm can comprise 0.05 cm$^3$/g or more (e.g., at least 0.1, 0.15, 0.2 or 0.25 cm$^3$/g) of the total pore volume. If present, any pores having a pore size greater than 2 nm, which may include mesopores and/or macropores, can comprise 0.15 cm$^3$/g or less (e.g., less than 0.1 or 0.04 cm$^3$/g) of the total pore volume.

In various embodiments, the microporous activated carbon can be formed from a lignocellulosic or non-lignocellulosic carbon precursor. An example method for producing an activated carbon material comprises heating a natural, non-lignocellulosic carbon precursor in an inert or reducing atmosphere to form a first carbon material, mixing the first carbon material with an inorganic compound to form an aqueous mixture, heating the aqueous mixture in an inert or reducing atmosphere to incorporate the inorganic compound into the first carbon material, and removing the inorganic compound from the first carbon material to produce a microporous activated carbon material.

In the foregoing example, the natural non-lignocellulosic carbon precursor can be heated at a temperature effective to carbonize the precursor material. Example carbonization temperatures are greater than about 450° C. (e.g., at least 450, 500, 550, 600, 650, 700, 750, 800, 850 or 900° C.). The inert or reducing atmosphere used during carbonization of the carbon precursor can comprise a gas or gas mixture of one or more of hydrogen, nitrogen, ammonia, helium or argon.

After carbonization of the carbon precursor, the resulting first carbon material can be mixed with an inorganic chemical activating agent. The inorganic compound used to activate the first carbon material can include an alkali hydroxide or chloride (e.g., NaOH, KOH, NaCl, KCl), phosphoric acid, or other suitable salt such as $CaCl_2$ or $ZnCl_2$.

The first carbon material and inorganic compound can be combined in any suitable ratio. A ratio (wt. %/wt. %) of first carbon material to inorganic compound can range from about 10:1 to 1:10 (e.g., 9:1, 8:1, 7:1, 6:1, 5:1 4:1, 3:1, 2:1, 1:1, 1:2, 1:3, 1:4, 1:5, 1:6, 1:7, 1:8 or 1:9).

Advantageously, the step of mixing can comprise mixing the first carbon material with an aqueous mixture of the inorganic compound. During the mixing, the inorganic compound can be homogeneously or substantially homogeneously mixed with the first carbon material. In one approach, the inorganic compound is initially dissolved in a solvent such as water. The solution comprising the inorganic compound is then combined with the first carbon material, and the resulting mixture can be allowed to age for an amount of time effective to permit thorough mixing of the inorganic compound with the first carbon material. By way of example, the mixture can be aged for 0.5, 1, 2, 4, 8 or more hours (e.g., from 0.5 to 8 hours).

After the inorganic compound is mixed with the first carbon material and optionally aged, the mixture is heated at a temperature effective to incorporate the inorganic compound into the first carbon material. The mixture can be heated at a temperature from about 300° C. to 1000° C. in an inert or reducing environment for a predetermined time (e.g., 0.5, 1, 2, 4, 8, or more hours) in order to activate the carbon.

Following carbonization/activation, the activated carbon product can be washed to remove both the inorganic compound and any chemical species derived from reactions involving the inorganic compound, dried and optionally ground to produce a microporous activated carbon material.

A preferred solvent for extracting the inorganic compound is water. Optionally, the extraction solvent can include an acid. One process for removing the inorganic compound involves sequentially rinsing the activated carbon with water and acid. A further process for removing the inorganic compound involves rinsing the activated carbon with an aqueous acid mixture (e.g., mixture of acid and water). Acids used during the extraction can include hydrochloric acid. The process of extracting the inorganic compound forms a microporous, activated carbon material, the majority of the pores being defined by the volume previously filled by the inorganic compound.

The performance (energy and power density) of an ultracapacitor depends largely on the properties of the activated carbon material that is incorporated into the composite electrode. The activated carbon formed according to the foregoing method can be used to form carbon-based composite electrodes for economically viable, high power, high energy density devices. The properties of the activated carbon material, in turn, can be gauged by evaluating the porosity and pore size distribution of the material, the nitrogen content, the oxygen content, the structural order of the carbon atoms, and the electrical properties of the activated carbon material when incorporated into such an electrode. Relevant electrical properties include the area-specific resistance, and the specific capacitance.

The microporous activated carbon can have a nitrogen content greater than 0.1 wt. % and as high as, for example, about 5 wt. % (e.g., greater than 0.1, 0.2, 0.5, 1, 1.5, 2, 2.5, 3, 3.5, 4, 4.5 or 5 wt. %). Microporous activated carbon materials derived from non-lignocellulosic precursors, for example, can have a nitrogen content that is greater than the nitrogen content of resin-derived activated carbon. Without wishing to be bound by theory, the incorporation of nitrogen into activated carbon is believed to decrease resistance and increase capacitance, and thus improve the efficacy of such activated carbon when used in the form of carbon-based composite electrodes in electrochemical cells such as EDLCs. In the processes disclosed herein, nitrogen can incorporated into the microporous activated carbon during carbonization/activation and advantageously without the need for additional processing steps.

Optionally, the oxygen content in the activated carbon can be decreased by heating the activated carbon to form a low oxygen content material. The oxygen content decreasing heat treatment step includes heating the microporous activated carbon in an inert or reducing atmosphere to a temperature effective to decrease the oxygen content.

A furnace temperature that can be used in conjunction with an inert or reducing gas to decrease the oxygen content in the activated carbon ranges from about 200° C. to 1200° C. (e.g., 200, 250, 300, 350, 400, 450, 500, 550, 600, 650, 700, 750, 800, 850, 900, 950, 1000, 1050, 1100, 1150 or 1200° C.). Suitable inert gases include nitrogen ($N_2$) and argon (Ar). In embodiments, a reducing gas can include hydrogen ($H_2$), ammonia ($NH_3$) or a gas mixture comprising hydrogen and nitrogen (i.e., forming gas). The hydrogen content in the gas mixture can be 6% or less (e.g., less than 6, 5, 4, 3, 2, or 1% $H_2$). According to an embodiment, a low oxygen content, microporous activated carbon material has an oxygen content of less than 5 wt. % (e.g., less than 5, 4.5, 4, 3.5, 3, 2.5, 2, 1.5, 1 or 0.5 wt. %).

The nitrogen content (wt. %) of select activated carbon samples was determined using a Thermo Flash analyzer. The technique is the classical Dumas method, which uses thermal conductivity detection (TCD), and is described by ASTM D5373 and ASTM D5291. Weighed samples are combusted in oxygen at 950° C. The combustion products (including $N_2$ and $NO_N$) are swept with a helium carrier gas through combustion catalysts, scrubbers, and through a tube filled with reduced copper. The copper removes excess oxygen and reduces $NO_x$ to $N_2$. The $N_2$ is then separated from other gases on a chromatography column and measured with TCD. Oxygen content (wt. %) is measured according to ASTM D5622 (Huffman Laboratories, Inc.).

The carbon structural order can be determined from powder samples using low angle X-ray diffraction (XRD). To prepare samples for XRD, powdered activated carbon material is lightly ground in an agate mortar and pestle. The ground sample is pressed into a Bruker-AXS powder sample holder. X-ray diffraction results are obtained using copper $K_\alpha$ radiation (1.5406 Å) on a Bruker-AXS D4 Endeavor X-ray diffractometer over a 2-theta angular range of 0.5-20 degrees with a step size of 0.02 degrees and a dwell time of 1 second.

The carbon structural ratio is computed as a normalized intensity of the X-ray reflection at 60 Angstroms. Specifically, the intensity of the diffracted beam at a d-spacing of 60 Angstroms ($I_{60}$) is divided by the positive difference between the intensity at a d-spacing of 176 Angstroms ($I_{176}$) and the intensity at a d-spacing of 15 Angstroms ($I_{15}$). Thus, the carbon structural order ratio is defined herein as $SOR=I_{60}/|(I_{176}-I_{15})|$.

In one embodiment, an activated carbon material derived, for example, by carbonizing and activating a non-lignocellulosic carbon precursor, has a structural order ratio less than or equal to 0.08, a nitrogen content greater than 0.1 wt. %, and an oxygen content of less than 3 wt. %. Additional aspects of activated carbon materials are disclosed in commonly-owned U.S. patent application Ser. No. 12/335,044, the contents of which are incorporated by reference herein.

Once formed, the microporous activated carbon can be incorporated into one or more carbon-based layers of a composite electrode. In a typical electric double layer capacitor (EDLC), a pair of electrodes is separated by a porous separator and the electrode/separator/electrode stack is infiltrated with a liquid organic or inorganic electrolyte. The carbon-based layers comprise activated carbon powder that has been mixed with other additives (e.g., binders) and compacted into a thin sheet and laminated either directly or via an intermediate conductive layer onto a conductive metal current collector backing.

By way of example, a carbon-based layer having a thickness in the range of about 100-300 micrometers can be prepared by rolling and pressing a powder mixture comprising 70-95 wt. % microporous activated carbon, 0-10 wt. % carbon black and 5-20 wt. % binder (e.g., a fluorocarbon binder such as PTFE or PVDF). Optionally, a solvent can be used to form the powder mixture into a paste that can be pressed into a carbon sheet and dried. Carbon sheets can be calendared, stamped or otherwise patterned and laminated to a conductive current collector or a current collector coated with a conductive layer to form a carbon-based composite electrode. Prior to incorporation in the composite electrode, example carbon sheets can have a length, width and thickness of 18 inches, 3.75 inches and 250 microns, respectively. The composite electrode can be incorporated into an energy storage device.

During use, an electric double layer can form via the stored charge that accumulates on opposing electrodes. The amount of charge stored in the electric double layer impacts the achievable energy density and power density of the capacitor.

Electrical properties (e.g., volumetric capacitance and gravimetric capacitance) of microporous activated carbon materials can be evaluated by measuring the characteristics of carbon-based composite films. The carbon-based composite films evaluated herein include 85 wt. % activated carbon material, 5 wt. % conductive carbon (e.g., Black Pearls®, which is marketed by Cabot Corporation, Boston, Mass.), and 10 wt. % Teflon® (PTFE). A button cell can be formed by punching carbon disks having a diameter of 0.625 inches from sheets of the composite material. A separator is placed between identical carbon disks which, in turn, are sandwiched between two conductive carbon-coated aluminum current collectors. A thermoset polymer ring is formed around the periphery of the assembly to seal the cell, which is filled with an organic electrolyte such as tetraethylammonium-tetrafluoroborate (TEA-TFB) in acetonitrile. A suitable concentration of electrolyte can range from 1 to 2M, e.g., 1.25, 1.5, 1.75 or 2M.

The capacitance of the cell ($C_{cell}$) is measured from galvanostatic discharge. The cell is first charged at a constant current (icharge) to a desired potential (e.g., 2.7 V), which is followed by a constant current discharge (idischarge). According to Ohm's law, capacitor current (i) is proportional to the time derivative of capacitor voltage according to:

$$i = C \frac{dV}{dt} \qquad (1)$$

where C is capacitance, V is the cell voltage (in Volts) and t is time (in seconds).

By measuring the slope from the galvanostatic discharge curve (cell voltage vs. time), the cell capacitance (in Farads) can then be calculated as:

$$C_{cell} = \frac{i_{discharge}}{dV/dt} \qquad (2)$$

The cell capacitance is the harmonic sum of two individual capacitances represented by the electrochemical double layer capacitance of each of the carbon disks (capacitors in series). This relationship can be expressed as:

$$\frac{1}{C_{cell}} = \frac{1}{C_1} + \frac{1}{C_2} \qquad (3)$$

where $C_1$ and $C_2$ are the double layer capacitances of the individual carbon disks in the cell.

The magnitudes of these capacitances can be correlated to the volumetric specific capacitance of the carbon disks as:

$$C_1 = C_{sp,1} \times V_1 \quad (4)$$

$$C_2 = C_{sp,2} \times V_2 \quad (5)$$

where $C_{sp,1}$ and $C_{sp,2}$ are specific capacitances of the individual carbon disks (in F/cm$^3$) and $V_1$ and $V_2$ are the corresponding electrode volumes. Because the test cell uses disks having identical size and composition, $C_1 = C_2$, $C_{sp,1} = C_{sp,2}$ ($= C_{sp}$) and $V_1 = V_2$ ($= V_{total}/2$, where $V_{total}$ is the total volume (cm$^3$) of carbon in the cell). Equations (3), (4) and (5) can be combined to give a volumetric capacitance, $C_{sp}$ as:

$$\frac{1}{C_{cell}} = \frac{2}{C_{sp} \times V_{total}} + \frac{2}{C_{sp} \times V_{total}} \quad (6)$$

or, $$C_{sp} = \frac{4 \times C_{cell}}{V_{total}} \quad (7)$$

The energy storage device can include an ultracapacitor. Ultracapacitors can have a jelly roll design, prismatic design, honeycomb design, or other suitable configuration. A carbon-based composite film can be incorporated into a carbon-carbon ultracapacitor or into a hybrid ultracapacitor. In a carbon-carbon ultracapacitor, both the positive electrode and the negative electrode comprise carbon-based films. In a hybrid ultracapacitor, one of the electrodes is carbon-based, and the other electrode can be a pseudo capacitive material such as lead oxide, ruthenium oxide, nickel hydroxide, or another material such as a conductive polymer (e.g., parafluorophenyl-thiophene).

Microporous activated carbon produced using a non-lignocellulosic precursor offers significantly higher energy storage capacity in EDLCs compared to major commercial carbons. For example, when the microporous activated carbon according to the present disclosure is incorporated into a carbon-based composite film also comprising carbon black and PTFE, the volumetric specific capacitance is greater than 70 F/cm$^3$ (e.g., greater than 70, 75, 80, 85, 90, 92, 94, 96, 98 or 100 F/cm$^3$).

Through-thickness resistance measurements on assembled carbon-based composite electrodes were conducted on 1 3/16 inch diameter composite electrode disks. The electrode structures were sandwiched between 1 inch diameter ceramic cylinders that were wrapped in silver foil. An Instron 4202 was used to apply a 100 pound axially compressive load to the composite electrode, and DC four-wire resistance measurements were made using a Keithley 2700 multimeter. The area-specific resistance ($\Omega$-cm$^2$) was calculated as the product of the measured resistance ($\Omega$) and the geometric area of the electrode (cm$^2$). Table 1 shows the effect of lamination temperature and lamination pressure (in pounds per linear inch) on the area-specific resistance. From Table 1, the area-specific resistance is indirectly proportional to both the lamination temperature and the lamination pressure.

TABLE 1

Effect of lamination conditions on resistance of composite electrodes

| Lamination Temp [° C.] | Lamination P [pli] | Area-specific resistance [$\Omega$-cm$^2$] |
|---|---|---|
| 200 | >200 | 0.13 |
| 200 | 150 | 0.16 |
| 100 | 200 | 0.19 |
| 21 | 200 | 0.39 |

As used herein, unless expressly defined otherwise, "natural, non-lignocellulosic carbon precursor" means at least one natural, non-lignocellulosic carbon precursor. A substance that contains both cellulose and lignin is lignocellulosic and, for example, can include any of several closely-related substances constituting the essential part of woody cell walls of plants having cellulose intimately associated with lignin. The non-lignocellulosic carbon precursors are substantially free of at least one of lignin and cellulose. By substantially free is meant that at least one of the lignin and cellulose comprise, for example, at most 0.5, 1 or 2 wt. % of the composition of the carbon precursor.

In one embodiment, the natural non-lignocellulosic carbon precursor contains cellulose and is substantially free of lignin. In a further embodiment, the natural non-lignocellulosic carbon precursor contains lignin but is substantially free of cellulose. In a still further embodiment, the natural non-lignocellulosic carbon precursor is substantially free of both lignin and cellulose. The natural, non-lignocellulosic carbon precursor is not a synthetic material such as a synthetic resin.

Lignin, which is a Latin word for wood, is a compound that imparts rigidity to a plant. Lignin is a three-dimensional polymer having an amorphous structure and a high molecular weight. Of the three main constituents in plant fibers, lignin has the least affinity for water. In addition, lignin is a thermoplastic (i.e., lignin starts to soften at relatively low temperature and, with increasing temperature, will flow readily).

Cellulose is a basic structural component of plant fibers. Cellulose molecules can comprise, e.g., glucose units that are linked together in long chains, which in turn are linked together in bundles called microfibrils. Hemicelluloses are also found in plant fibers. Hemicelluloses are typically polysaccharides bonded together in relatively short, branching chains. Hemicelluloses, which are usually hydrophilic, are usually intimately associated with the cellulose microfibrils, embedding the cellulose in a matrix. Typical lignocellulosic fibers from agriculture are found, for example, in straws, hemp, flax, sisal, and jute.

The natural, non-lignocellulosic carbon precursor can be derived from an edible grain such as wheat flour, walnut flour, corn flour, corn starch, rice flour, and potato flour. Other natural, non-lignocellulosic carbon precursors include coffee grounds, potatoes, beets, millet, soybean, rape, barley, and cotton. The non-lignocellulosic material can be derived from a crop or plant that may or may not be genetically-engineered.

An exemplary non-lignocellulosic carbon precursor is wheat flour. Wheat flour is derived by milling wheat kernels, which are the seeds of the wheat plant. Wheat kernels have three main parts: the endosperm, the germ, and the bran. Whole wheat flour contains all three parts of the kernel, while white flour is milled from just the endosperm.

Compositionally, white flour contains mostly starch, although additional components are naturally present. The main components in white flour, with approximate percentages provided in parentheses, are starch (68-76%), proteins (6-18%), moisture (11-14%), gums (2-3%), lipids (1-1.5%), ash (<0.5%) and sugars (<0.5%).

Starch makes up the bulk of white flour. Even bread flour, considered "low" in starch, contains more starch than all other components combined. Starch is typically present in flour as small grains or granules. Chunks of protein bind starch granules together and hold them in place within the endosperm. Glutenin and gliadin, the gluten-forming proteins, typicall make up about 80 percent of the proteins in the endosperm. Other proteins in white flour include enzymes, such as amylase, protease, and lipase. Other carbohydrates in flour besides starch include gums, specifically pentosan gums. Pentosan gums are a source of soluble dietary fiber. Lipids include oils and emulsifiers, and ash includes inorganic matter (mineral salts), which can comprise iron, copper, potassium, sodium, and zinc.

EXAMPLES

The invention will be further clarified by the following examples.

Example 1

Wheat flour (3000 g) is placed in a graphite crucible and heated in a retort furnace (CM Furnaces model 1216FL). The furnace temperature is increased at a heating rate of 150° C./hr from room temperature to 800° C., maintained at 800° C. for 2 hrs, and then allowed to cool down naturally to 70° C. or less. During the foregoing heating/cooling cycle, the furnace is purged with $N_2$.

As a result of heating under flowing $N_2$, the wheat flour is carbonized and converted to a first carbon material. The first carbon material can be ground to a powder using a hammer pound, pulverization and vibramilling. The ground carbon powder can have a particle size ($d_{50}$) of 10 micrometers or less (e.g., 1, 2, 5 or 10 micrometers).

The powdered first carbon material (300 grams) is mixed with 1500 grams of a 45 wt. % aqueous solution of KOH. The resulting mixture is stirred and heated at about 100° C. on a hot plate until the liquid is removed and a solid cake is formed. The cake can be broken into smaller pieces by mechanical force.

The carbon/KOH mixture is placed in SiC crucibles (Hexyloy® SA grade) and heated in a retort furnace. The furnace temperature is increased at a heating rate of 150° C./hr from room temperature to 750° C., maintained at 750° C. for 2 hours, and then allowed to cool down naturally to a temperature of about 100° C. During this heating/cooling cycle, the furnace is purged with $N_2$. By heating the carbon/KOH mixture, the KOH can be incorporated into the first carbon material During cooling, once the furnace temperature reaches 100° C., the furnace temperature is maintained at 100° C. for 3 additional hours during which time the furnace is purged with $N_2$ saturated with water vapor. Nitrogen gas saturated with water vapor can be produced by bubbling $N_2$ gas through 95° C. de-ionized water. The furnace is then allowed to cool down naturally to 70° C. or lower.

The resulting activated carbon can then be washed to remove excess potassium, potassium compounds, and other impurities. Washing can comprise rinsing the activated carbon with water or, according to an embodiment, alternately rinsing the activated carbon with water and a mixture of water and acid. One example washing sequence is disclosed below.

In a first washing step, the activated carbon is combined with 3000 mL of de-ionized water and the mixture is stirred and heated on a hot plate at a temperature of from about 90 to 100° C. for 30 minutes. Solid material (i.e., carbon) is separated from the liquid by vacuum-assisted filtration.

In a second washing step, the previously-obtained carbon material is combined first with 1980 mL of de-ionized water and then 990 mL of 37% aqueous HCl. The mixture is stirred and heated on a hot plate at a temperature of from about 90 to 100° C. for 60 minutes, after which the solid material is separated from the liquid by vacuum-assisted filtration.

In a third washing step, the previously-obtained carbon material is combined with 3000 mL of DI water. The mixture is stirred and heated on a hot plate at a temperature of from about 90 to 100° C. for 60 minutes. The carbon material is then separated from the liquid by vacuum-assisted filtration.

The third washing step is then repeated until the pH of the effluent liquid is the same as that of the de-ionized water used for washing. Finally, the activated carbon is dried in a vacuum oven at 125° C. for 18 hours to produce a second carbon material. The second carbon material comprises microporous, activated carbon powder.

In order to decrease the oxygen content in the activated carbon material, the activated carbon can be treated with an additional heat treatment, which includes heating the activated carbon material in an inert or reducing atmosphere.

In an embodiment, the microporous activated carbon material is placed in SiC crucibles and loaded into a furnace (CM Furnaces model 1216FL or 1212FL). The furnace temperature is increased at a heating rate of 150° C./hr to a temperature of about 800° C., maintained at temperature for 2 hours, and then allowed to cool down naturally. During the foregoing heating/cooling cycle, the furnace is constantly purged with either $N_2$ or a mixture of $H_2$ and $N_2$.

Upon cooling, once the furnace temperature has reached 100° C., it is maintained at 100° C. for 3 additional hours during which time the furnace is purged with $N_2$ saturated with water vapor. The furnace is then allowed to cool down naturally to 70° C. or lower. The resulting activated carbon product can be dried in a vacuum oven at 125° C. for 18 hours.

Example 2

Differences in the pore size distribution and the resulting capacitance data between non-lignocellulosic activated carbon and commercially-available activated carbon are illustrated in the following example.

Pore size data is determined for both carbon samples using $N_2$ adsorption on a Micromeritics ASAP 2420 and calculated using the Density Functional Theory (DFT) assuming slit-shaped pores.

Pore size distribution data for a microporous activated carbon material made according to the process of Example 1 are shown in Table 2 together with comparative data from a commercially-available carbon material (Kuraray YP-50F). The Example 1 sample (Sample 1) corresponds to the activated carbon material obtained prior to the oxygen-reduction heat treatment.

In Table 2, TPV refers to total pore volume, while "V(<1 nm)," "V(micro)" and "V(meso)" refer to the volume of pores less than 1 nm, the volume of micropores, and the volume of mesopores. The percentage of all pores having a pore size of less than 1 nm, less than 2 nm, and within the range of mesoporous are indicated by "% V<1 nm," "% V<2 nm," and "% V(meso)."

TABLE 2

Activated carbon pore structure characteristics

| Sample | TPV [cm³/g] | V(<1 nm) [cm³/g] | V(micro) [cm³/g] | V(meso) [cm³/g] | % V <1 nm | % V <2 nm | % V(meso) |
|---|---|---|---|---|---|---|---|
| Sample 1 | 0.723 | 0.490 | 0.707 | 0.016 | 68 | 98 | 2 |
| Comparative | 0.589 | 0.268 | 0.543 | 0.046 | 46 | 92 | 8 |

Sample 1 shows a higher total pore volume (0.723 cm³/g) than the Comparative example (0.589 cm³/g). Further, in Sample 1, 98% of the total pore volume was contributed by micropores (i.e. pores smaller than 20 Å) and 2% by mesopores (i.e., pores in the range of 20-500 Å). To break down the distribution further, pores narrower than 10 Å constituted 68% of the total pore volume. Such a high ratio of microporosity to mesoporosity contributes to a decidedly greater specific capacitance for Sample 1 as compared with the commercial carbon.

Capacitance values are obtained by incorporating the activated carbon into a button cell electrode. To form the button cell, activated carbon is combined with carbon black (Black Pearl 2000) and PTFE. The carbon black serves as a conductive additive and the PTFE serves as a binder. The activated carbon, carbon black and PTFE are blended in the proportion of 85:5:10 by weight and rolled into electrodes. A solution of 1.5 M tetraethylammonium tetrafluoroborate (TEA-TFB) in acetonitrile is used as the electrolyte.

As shown in Table 3, the volumetric specific capacitance of Sample 1 is significantly greater than the volumetric specific capacitance of the Comparative example.

TABLE 3

Button cell measurements for activated carbon

| Sample | Volumetric Specific Capacitance, $C_{sp,v}$ [F/cm³] |
|---|---|
| Sample 1 | 96 |
| Comparative | 67 |

Example 3

Figure 2:
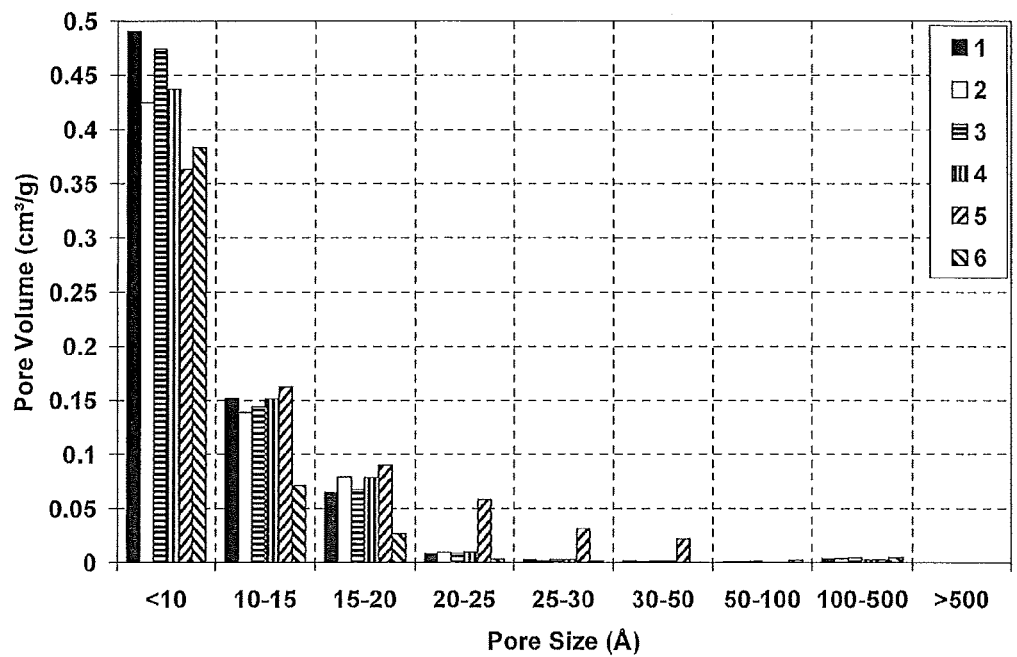
FIG. 2 is graph of pore volume versus pore size for microporous activated carbon materials according to various embodiments.
Figure 3:
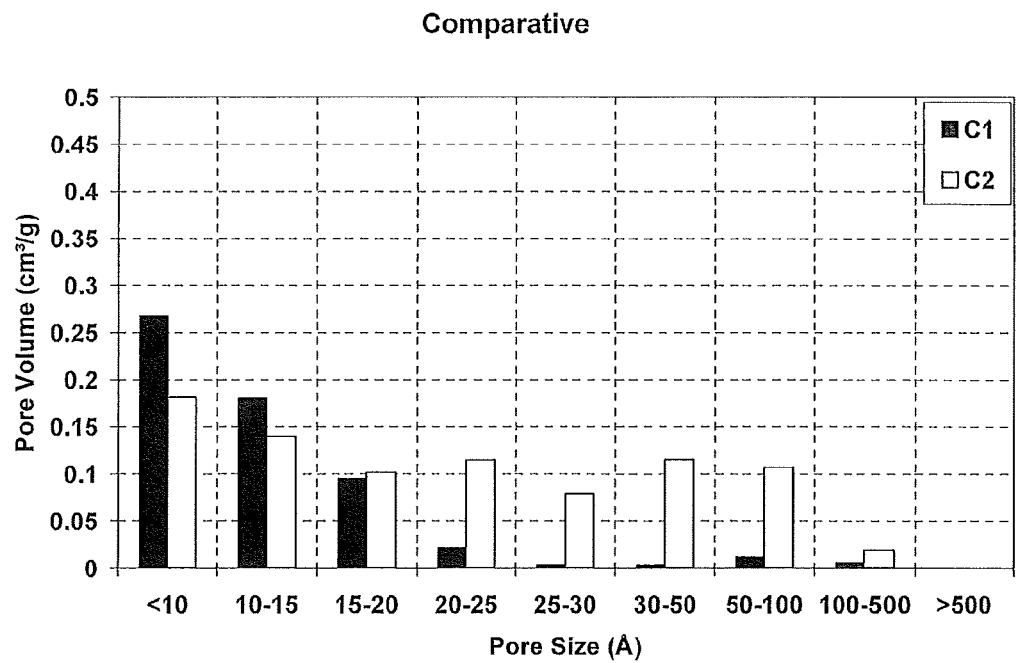
FIG. 3 is graph of pore volume versus pore size for comparative activated carbon materials.

A plot of pore volume versus pore size for microporous activated carbon materials according to various embodiments is shown in FIG. 2. A companion plot showing pore volume versus pore size for commercially-available activated carbon materials (Kuraray YP50F and Supercap BP 10) is shown in FIG. 3. In FIG. 3, the Kuraray material is identified as Sample C1 and the Supercap material is identified as Sample C2. In both Figures, the pore volume is plotted as a total based on the contribution from pores having a specified range of pore sizes.

In FIG. 2, Samples 1-5 are derived from wheat flour, and Sample 6 is derived from corn meal. Process details for preparing the microporous activated carbon materials disclosed in FIG. 2 are disclosed in Example 1, and as with Sample 1, do not include the oxygen-reduction heat treatment. Particular process conditions for Samples 1-6 are outlined in Table 4, which identifies the carbon precursor, carbonization temperature, ratio of KOH to carbonized precursor, and activation temperature. In addition to the Example 1 process parameters, Sample 4 was additionally heated to 700° C. for 2 hr in 1% $H_2/N_2$ following activation.

In lieu of the Example 1 process, Sample 5 was prepared by forming an aqueous mixture (1:2 by weight) of wheat flour and a 45 wt. % KOH solution, drying the mixture at 90-100° C. on a hot plate, heating the dried material at 800° C. in an $N_2$ atmosphere to form a first carbon material, washing the first carbon material sequentially with dilute HCl and water to form a second carbon material, and then drying the second carbon material in a vacuum over at 125° C. for 18 hours.

TABLE 4

Process conditions for microporous activated carbon materials

| Sample # | Precursor | Carbonization Temp. [° C.] | KOH:carbonized precursor ratio | Activation Temp. [° C.] |
|---|---|---|---|---|
| Sample 1 | Wheat flour | 800° C. | 5:1 | 750° C. |
| Sample 2 | Wheat flour | 800° C. | 5:1 | 800° C. |
| Sample 3 | Wheat flour | 800° C. | 5:1 | 750° C. |
| Sample 4 | Wheat flour | 800° C. | 5:1 | 750° C. |
| Sample 5 | Wheat flour | 800° C. | 2:1 | 800° C. |
| Sample 6 | Corn meal | 900° C. | 5:1 | 850° C. |

As seen with reference to FIG. 2, the contribution to the pore volume of ultramicropores (d<1 nm) is greater than 0.3 cm³/g for samples 1-6, and greater than 0.4 cm³/g for samples 1-4. The contribution to the pore volume of pores having a size in the range 1 nm<d<2 nm is at least 0.05 cm³/g, and can be greater than 0.1 or 0.15 cm³/g. Any pores having a size greater than 2 nm contribute, in total, less than 0.15 cm³/g to the pore volume (e.g., less than 0.15, 0.10, 0.05 or 0.025 cm³/g).

Example 4

Figure 4:
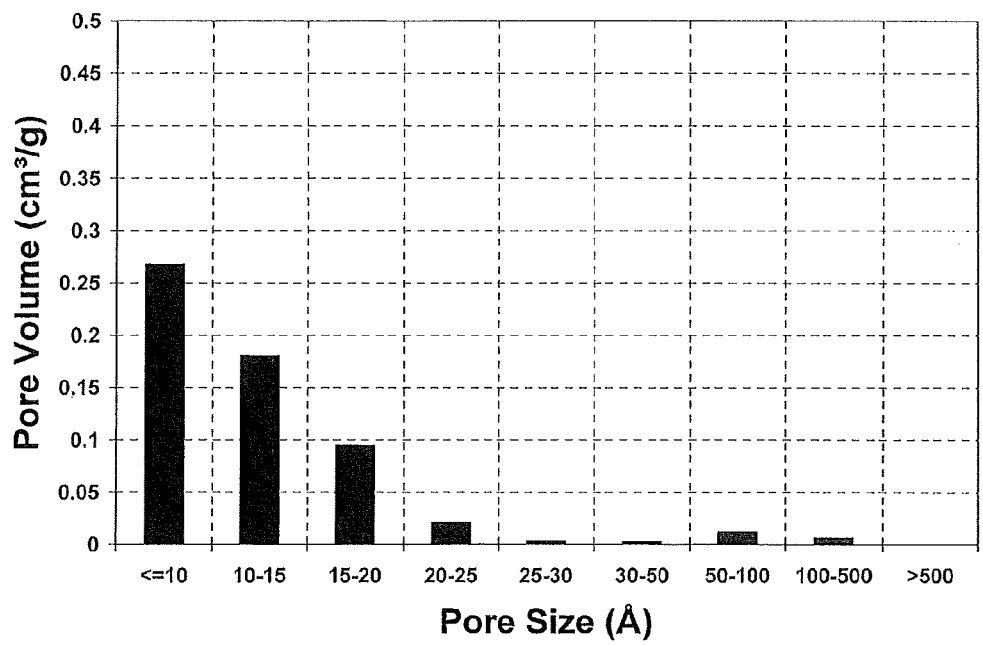
FIGS. 4-6 are graphs of pore volume versus pore size for microporous activated carbon materials according to various embodiments.
Figure 5:
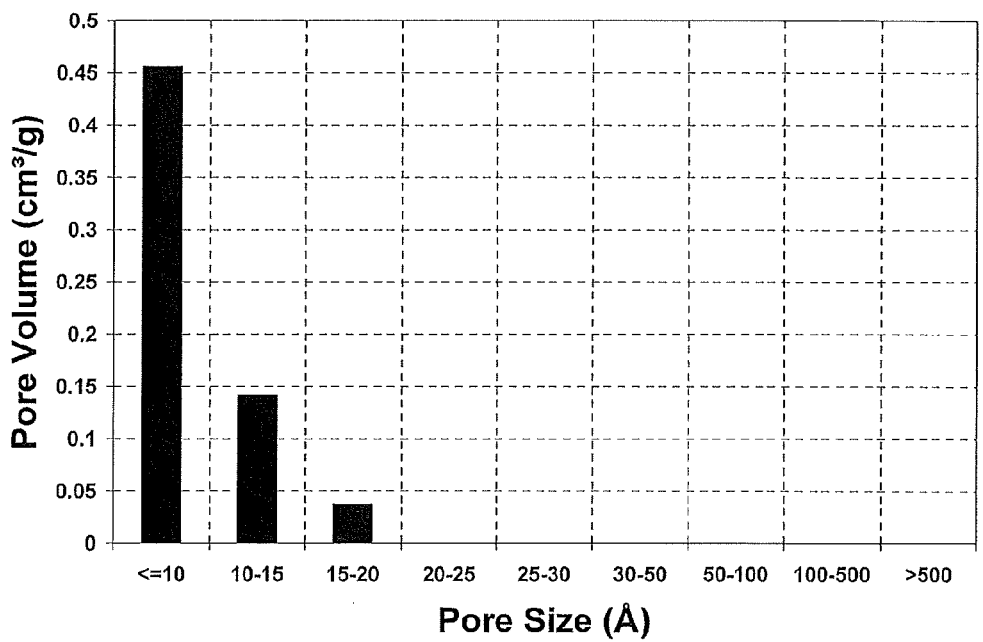
Figure 6:
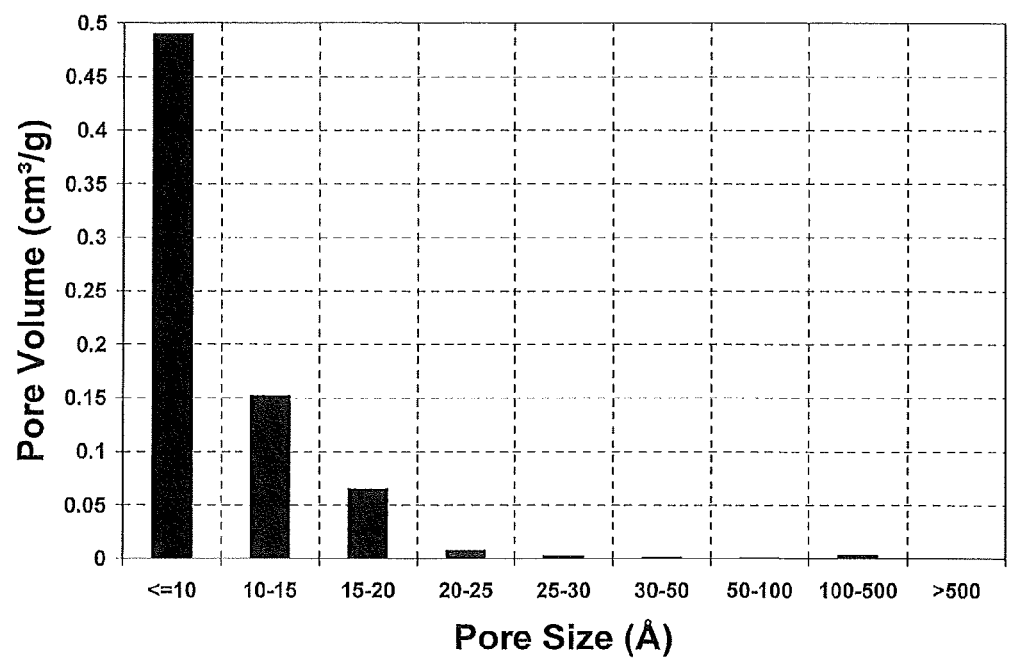

Three carbon-based composite electrodes (electrodes I-III) are fabricated using three different microporous activated carbons (carbons FIGS. 4-6 are plots of pore volume versus pore size for the three different activated carbon materials (carbons I-III).

All three composite electrodes include a current collector, first and second conductive layers formed over the major surfaces of the current collector, and carbon-based layers formed over the respective conductive layers. Aluminum sheet (25 microns thick) is used for the current collectors. Particularly, the aluminum sheet is used as-is, i.e., without removal of the native oxide, such that the native oxide is incorporated into the carbon-based composite electrode. In the example of an aluminum current collector, a native aluminum oxide layer having a thickness of from 2 to 6 nm is at the interface between, and in contact with both the aluminum and the respective conductive layers.

A commercially-available conductive carbon coating, which comprises carbon black, graphite, and a polymeric binder is used as the conductive layer. The thickness of the conductive carbon coating is approximately 1-2 microns. The carbon-based layer (100 microns thick) comprises microporous activated carbon (85%), carbon black (5%) and PTFE binder (10%). The lamination conditions for electrodes I-III include a lamination temperature of 200° C. and a lamination pressure of 250 pli.

In Table 5, the area-specific resistance of composite electrodes I-III is summarized together with the energy density and power density obtained from by testing the electrodes with a solution of 1.5 M tetraethylammonium tetrafluoroborate (TEA-TFB) in acetonitrile as the electrolyte.

TABLE 5

Resistance, energy density and power density of composite electrodes

| Electrode | Area-specific resistance [$\Omega$-cm$^2$] | Energy density [Wh/l] | Power density [W/l] |
|---|---|---|---|
| I | 0.15 | 3.6 | 2830 |
| II | 0.30 | 5.5 | 1508 |
| III | 0.08 | 5.3 | 3181 |

In embodiments, the area-specific resistance of the composite electrode is less than 0.3 $\Omega$-cm$^2$ (e.g., less than 0.25, 0.2, 0.15 or 0.1 $\Omega$-cm$^2$). Prior to incorporation into a composite electrode, the area-specific resistance of a carbon-based layer formed using carbon I is 0.03 $\Omega$-cm$^2$. In a further embodiment, the area-specific resistance of a carbon-based layer used to form a composite electrode is less than 0.05 $\Omega$-cm$^2$. As seen with reference to Table 5, obtaining both high energy density and high power density can be achieved by optimizing the attributes of the composite electrode, including the electrode resistance, activated carbon pore size, and pore size distributions.

This disclosure provides electrode structures for EDLC applications. The electrode structures comprise activated carbon materials, which can be characterized by high microporosity. Such carbons provide high specific capacitance and in turn, high energy storage capacity and long term stability in EDLCs.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A composite electrode for an EDLC, the composite electrode comprising:
    a current collector having opposing first and second major surfaces;
    a first conductive layer formed over the first major surface;
    a second conductive layer formed over the second major surface; and
    a first carbon-based layer and a second carbon-based layer formed over respective ones of the first and second conductive layers,
    wherein the first and second carbon-based layers comprise activated carbon powder, the activated carbon powder comprising:
    pores having a size of $\leq$1 nm, which provide a combined pore volume of $\geq$0.3 cm$^3$/g;
    pores having a size of from >1 nm to $\leq$2 nm, which provide a combined pore volume of $\geq$0.05 cm$^3$/g; and
    <0.15 cm$^3$/g combined pore volume of any pores having a size of >2 nm.

2. The composite electrode according to claim 1, wherein the current collector comprises aluminum.

3. The composite electrode according to claim 1, wherein the current collector comprises a native oxide layer formed over at least one of the first and second major surfaces.

4. The composite electrode according to claim 1, wherein the current collector has a thickness of from 5 to 100 micrometers.

5. The composite electrode according to claim 1, wherein the first and second conductive layers comprise graphite, carbon black, and a binder.

6. The composite electrode according to claim 1, wherein the first and second conductive layers each have a thickness of from 0.1 to 10 micrometers.

7. The composite electrode according to claim 1, wherein the first and second carbon-based layers comprise activated carbon powder and a binder.

8. The composite electrode according to claim 1, wherein the first and second carbon-based layers comprise activated carbon powder, carbon black, and a binder.

9. The composite electrode according to claim 1, wherein the first and second carbon-based layers comprise 70-95 wt. % activated carbon powder, 0-10 wt. % carbon black, and 5-20 wt. % binder.

10. The composite electrode according to claim 1, wherein the first and second carbon-based layers comprise activated carbon powder, the activated carbon powder comprising pores having a size of less than or equal to 2 nanometers that provide a combined pore volume of at least 95% of a total pore volume of the activated carbon powder.

11. The composite electrode according to claim 1, wherein the first and second carbon-based layers comprise activated carbon powder, the activated carbon powder comprising pores having a size of less than or equal to 1 nanometer that provide a combined pore volume of at least 50% of a total pore volume of the activated carbon powder.

12. The composite electrode according to claim 1, wherein the first and second carbon-based layers comprise activated carbon powder having a total pore volume of at least 0.3 cm$^3$/g.

13. The composite electrode according to claim 1, wherein the first and second carbon-based layers comprise activated carbon powder having a pore volume of pores smaller than 1 nanometer of at least 0.25 cm$^3$/g.

14. The composite electrode according to claim 1, wherein the first and second carbon-based layers each have a thickness of from 20 to 500 micrometers.

15. The composite electrode according to claim 1, wherein the composite electrode has an area-specific resistance of less than 0.3 ohm-cm$^2$.

16. The composite electrode according to claim 1, wherein the composite electrode has an area-specific resistance of less than 0.15 ohm-cm$^2$.

17. The composite electrode according to claim 1, wherein the first and second carbon-based layers each have an area-specific resistance of less than 0.05 ohm-cm$^2$.

18. The composite electrode according to claim 1, wherein the activated carbon powder has a particle size of 10 micrometers or less.

* * * * *